(No Model.)
J. MURPHY.
RAILROAD VELOCIPEDE.
No. 249,251. Patented Nov. 8, 1881.
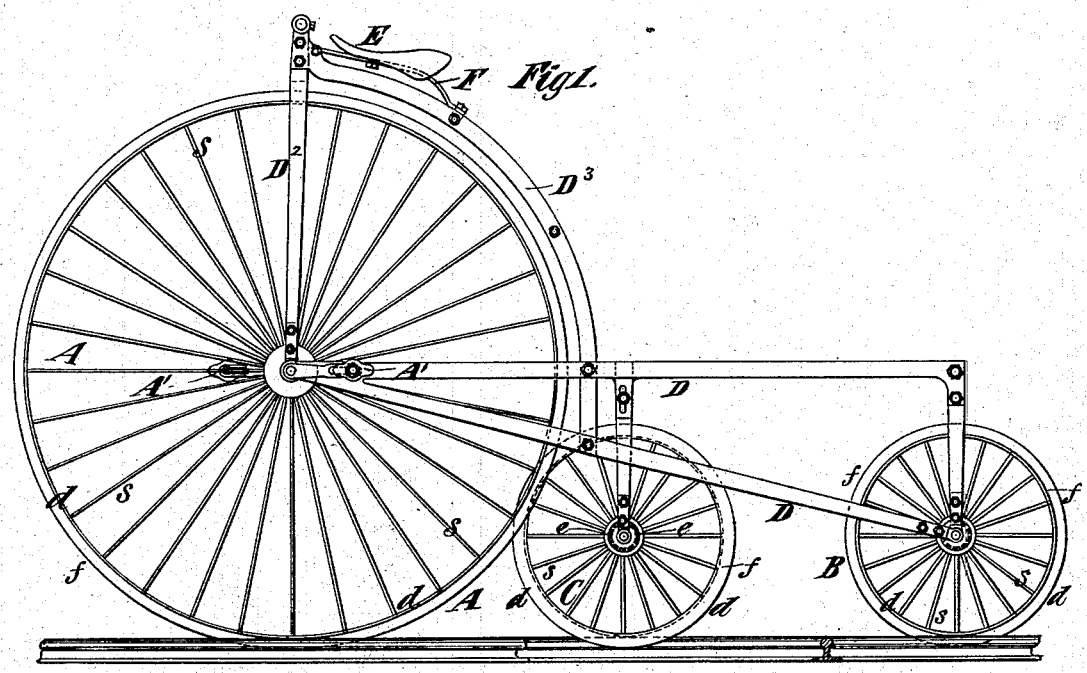
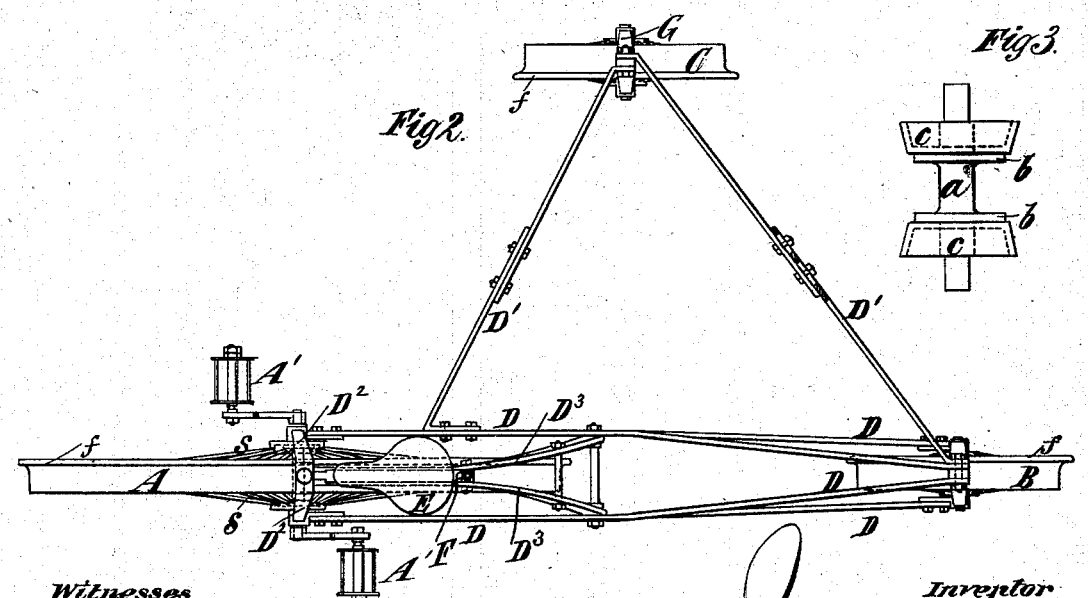
Witnesses
J. R. Keane
Jas. R. Bowen.
Inventor
Jeremiah Murphy
By his Atty.
Edwin H. Brown.

UNITED STATES PATENT OFFICE.

JEREMIAH MURPHY, OF BROOKLYN, NEW YORK.

RAILROAD-VELOCIPEDE.

SPECIFICATION forming part of Letters Patent No. 249,251, dated November 8, 1881.

Application filed September 24, 1881. (No model.)

*To all whom it may concern:*

Be it known that I, JEREMIAH MURPHY, of Brooklyn, in Kings county and the State of New York, have invented certain new and useful Improvements in Railroad-Velocipedes, of which the following is a specification.

My improvements consist in the combination, in a railway-velocipede, of a large flanged driving-wheel provided with cranks for the feet, a saddle arranged over said driving-wheel, a smaller flanged following-wheel behind the driving-wheel, a frame connecting said wheels, a steadying-wheel arranged opposite the space between the driving-wheel, and longitudinal adjustable braces forming a part of said frame and extending at reverse angles from near the ends of the frame proper to said steadying-wheel.

The improvements further consist in the combination, with a driving-wheel, a following-wheel, and a steadying-wheel arranged opposite the space between the driving-wheel and following-wheel, of means whereby the frame, may be vertically adjusted relatively to one of the wheels to distribute the weight of the velocipede and its freight more or less on the steadying-wheel, so as to insure a steady base.

The improvements further consist in a peculiarly-constructed frame for a railway-velocipede, possessing certain desirable characteristics.

The improvements also consist in a novel construction of wheels for a velocipede, whereby they may be made very cheap, light, and strong.

In the accompanying drawings, Figure 1 is a side view of a railroad-velocipede embodying my improvements. Fig. 2 is a top view of the same, and Fig. 3 is a top view of the hub of one of the wheels.

Similar letters of reference designate corresponding parts in all the figures.

A designates the driving-wheel. B designates the following-wheel, and C designates the steadying-wheel. They are all connected by a frame, D D', and are of similar construction. Each has a hub consisting of a short shaft, $a$, provided with flanges $b$, which are made integral with it, and is also provided with dish-collars $c$, which are fitted to the shaft $a$, and have outwardly-flaring rims. Spokes $s$, of steel or other wire, are fastened to the tread $d$ of the wheel, and are secured by nuts $e$ to the rims of the collars $c$. These spokes are alternately fastened to the different collars $c$, and as they are thus spread apart at the inner ends the wheels are made very strong, although quite light. The driving-wheel A and following-wheel B have flanges $f$ on one side, and the steadying-wheel has a flange, $f$, on the opposite side. By means of these flanges the velocipede is kept on the railroad-track on which it is used.

The frame D D' consists, essentially, of four pieces or strips of metal extending rearward from the driving-wheel to the following-wheel. The two lower pieces extend side by side from the bearings for the journals of the driving-wheel to the bearings for the following-wheel, and the two upper pieces extend from the bearings for the driving-wheel to a point above the bearings for the following-wheel, and are there connected by upright pieces to the lower pieces. From the bearings for the driving-wheel extend upright pieces $D^2$ to curved pieces $D^3$, which are connected to the pieces D and form the support for a seat or saddle, E, a spring, F, being interposed between the curved pieces $D^3$ and such seat or saddle. Cranks A' on the shaft of the wheel A, and adapted to be operated by the feet of a person sitting on the seat or saddle E, form the means for driving the velocipede.

The journals of the steadying-wheel are fitted in bearings in a strap, G, which extends over the top of such wheel, and is connected by braces D' to the pieces D. The strap G is preferably made in sections, the upper of which is connected to the lower, so as to be vertically adjustable relatively thereto. Their connection may consist of bolts passing through holes in one section and slots in the upper section. By adjusting the upper sections the velocipede may be canted more or less to distribute sufficient weight on the steadying-wheel C to insure a proper balance of the velocipede. The braces D' are made in sections, so as to be adjustable to cause the wheels to suit tracks of different gages, and the connections between these sections may be the same as the connections between the sections of the strap G.

If desirable, the space between the braces D' may be boarded over to form a platform on which tools or other articles may be carried, or on which men may ride.

It will be seen that by my invention I produce a very light and cheap railroad-velocipede, by which a high rate of speed may be attained with very little labor.

What I claim as my invention, and desire to secure by Letters Patent, is—

1. The combination, in a railroad-velocipede, of a large flanged driving-wheel provided with cranks for the feet, a saddle arranged over said driving-wheel, a smaller flanged following-wheel behind the driving-wheel, a frame connecting said wheels, a steadying-wheel arranged opposite the space between the driving-wheel and the following-wheel, and longitudinally-adjustable braces forming a part of said frame and extending at reverse angles from near the ends of the frame proper to said steadying-wheel, substantially as specified.

2. The combination, in a railroad-velocipede, with a large driving-wheel, a following-wheel arranged behind the same, and a steadying-wheel arranged opposite the space between the driving-wheel and following-wheel, of means whereby the velocipede may be canted more or less to properly balance it, substantially as specified.

3. The combination, in a railroad-velocipede, with a large driving-wheel, a following-wheel arranged behind the same, and a steadying-wheel arranged opposite the space between the two said wheels, of an extensible strap extending from the bearings of and passing over the steadying-wheel and affording provision for canting the velocipede to distribute the weight, substantially as specified.

4. The combination, in a railroad-velocipede, of a large driving-wheel, a smaller following-wheel, and a steadying-wheel arranged opposite the space between the said wheels and the frame D D' D² D³, substantially as specified.

5. The wheel consisting of the shaft $a$, provided with flanges $b$, the dish-shaped collars $c$, the tread $d$, nuts $e$, and spokes $s$, substantially as specified.

JEREMIAH MURPHY.

Witnesses:
T. J. KEANE,
JAMES R. BOWEN.